United States Patent
Benkreira et al.

(10) Patent No.: US 11,240,382 B2
(45) Date of Patent: Feb. 1, 2022

(54) COMPUTER-BASED SYSTEMS CONFIGURED FOR AUTOMATED SUBSCRIPTION MANAGEMENT AND METHODS THEREOF

(71) Applicant: Capital One Services, LLC, McLean, VA (US)

(72) Inventors: Abdelkader M'Hamed Benkreira, New York, NY (US); Michael Mossoba, Arlington, VA (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 47 days.

(21) Appl. No.: 16/907,959

(22) Filed: Jun. 22, 2020

(65) Prior Publication Data

US 2021/0400147 A1    Dec. 23, 2021

(51) Int. Cl.
*H04M 11/00*     (2006.01)
*H04M 15/00*     (2006.01)
(Continued)

(52) U.S. Cl.
CPC ........ *H04M 15/705* (2013.01); *G06Q 20/102* (2013.01); *G06Q 20/16* (2013.01); *H04M 15/58* (2013.01); *H04M 15/68* (2013.01)

(58) Field of Classification Search
CPC .... H04M 15/705; H04M 15/58; H04M 15/68; H04M 15/00; H04M 15/41; H04M 15/50; H04M 15/60; H04M 15/66; H04M 15/755; H04M 2203/556; H04M 3/2218; H04M 3/436; H04M 3/5175; H04M 3/56; H04M 2203/655; G06Q 20/102; G06Q 20/16; G06Q 10/107; G06Q 50/01; G06Q 30/0251; G06Q 10/10; G06Q 30/02; G06Q 10/0637; H04W 4/14; H04W 72/005; H04W 76/11; H04W 76/40; H04W 12/084; H04W 12/00; H04W 12/06; H04W 12/35; H04W 12/40; H04W 4/06; H04W 60/06; H04W 8/18;
(Continued)

(56) References Cited

U.S. PATENT DOCUMENTS 10,200,428 B1 *  2/2019  Rosenzweig ....... H04L 41/0806
10,397,624 B1 *  8/2019  Largman ............ H04N 21/2543
(Continued)

*Primary Examiner* — Stephen M D Agosta
(74) *Attorney, Agent, or Firm* — Greenberg Traurig, LLP

(57) ABSTRACT

Systems and methods of the present disclosure include at least one processor that receives electronic messages, each associated with a respective originating entity. Message metadata of each electronic message is extracted and list subscriptions are determined based on the message metadata. User interaction commands relative to each electronic message are tracked. Record similarity values for user activity records are determined based on a measure of similarity between the originating entity and each activity record. An engagement model is utilized to determine an engagement score indicative of a degree of user engagement with each originating entity based on the user activities and the user interaction metrics to generate a prediction indicative of the degree of user engagement. An unsubscribe condition is determined based on the engagement score being below a threshold score, and an unsubscribe command is automatically issued.

20 Claims, 7 Drawing Sheets

(51) Int. Cl.
*G06Q 20/10* (2012.01)
*G06Q 20/16* (2012.01)

(58) Field of Classification Search
CPC ...... H04W 8/183; H04W 8/186; H04H 20/38; H04H 2201/30; H04H 60/07; H04L 51/046; H04L 67/306; H04L 67/22; H04L 12/14; H04L 12/1407; H04L 12/1831; H04L 41/082; H04L 41/0893; H04L 41/12; G06N 20/00; G06N 7/005; G06N 3/08; G06N 20/20; G06N 5/04; G06N 20/10; G06N 3/006; G06N 3/0427
See application file for complete search history.

(56) References Cited

U.S. PATENT DOCUMENTS

| | | | |
|---|---|---|---|
| 10,904,375 B2* | 1/2021 | Phillips | G06Q 20/18 |
| 11,057,760 B2* | 7/2021 | Salmela | H04W 8/183 |
| 2007/0088832 A1* | 4/2007 | Tsang | G06Q 10/00 709/227 |
| 2013/0238721 A1* | 9/2013 | Patel | H04L 51/12 709/206 |
| 2014/0115067 A1* | 4/2014 | Rosenwald | G06Q 10/107 709/206 |
| 2016/0014060 A1* | 1/2016 | Vasudevan | H04L 51/14 709/206 |
| 2018/0375814 A1* | 12/2018 | Hart | H04L 67/306 |

\* cited by examiner

COMPUTER-BASED SYSTEMS CONFIGURED FOR AUTOMATED SUBSCRIPTION MANAGEMENT AND METHODS THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC, All Rights Reserved.

FIELD OF TECHNOLOGY

The present disclosure generally relates to improved computer-based systems configured for one or more novel technological applications of automatically managing a user's electronic messaging subscriptions according to online and offline user activities.

BACKGROUND OF TECHNOLOGY

Internet users often end up becoming subscribed to a large number of online mailing lists due to online activities, transactions, memberships, and other activities. Some of these lists are relevant to a user while others may not be. However, in order to remove the irrelevant subscriptions, users typically must find an unsubscribe option within the body of a message, on a user account page associated with the message, or by some other means specific to each message. This requires significant time and effort on the part of each user to manage electronic subscriptions.

Moreover, due to the high barrier to managing the electronic subscriptions, message inboxes and data connections can become congested due to the increased data communication and storage required by large numbers of message subscriptions.

SUMMARY OF DESCRIBED SUBJECT MATTER

In some embodiments, the present disclosure provides an exemplary technically improved computer-based method that includes at least the following steps of receiving, by at least one processor, at least one electronic message from at least one originating device associated with an originating entity; extracting, by the at least one processor, message metadata associated with each electronic message of the at least one electronic message; determining, by the at least one processor, a active electronic resource subscription associated with the at least one electronic message based on the message metadata of each electronic message; tracking, by the at least one processor, at least one user interaction command associated with at least one user interaction with the at least one electronic message; determining, by the at least one processor, a record similarity value for each user activity record of at least one user activity record in a activity record set based at least in part on a measure of similarity between the originating entity and each activity record of the at least one user activity record; utilizing, by the at least one processor, an engagement model to determine an engagement score indicative of a degree of user engagement with the originating entity based at least in part on the at least one user activity and the at least one user interaction metric, where the engagement model includes model parameters trained according to a date associated with the at least one user activity record and the at least one user interaction metric to generate a prediction indicative of the degree of user engagement; determining, by the at least one processor, an unsubscribe condition based at least in part on the engagement score being below a threshold engagement score; and automatically generating, by the at least one processor, an unsubscribe command in response to the unsubscribe condition causing the active electronic resource subscription to be cancelled by removing a user's electronic address from the active electronic resource subscription.

In some embodiments, the present disclosure provides another exemplary technically improved computer-based method that includes at least the following steps of receiving, by at least one processor, at least one electronic message from at least one originating device associated with an originating entity; extracting, by the at least one processor, message metadata associated with each electronic message of the at least one electronic message; determining, by the at least one processor, a active electronic resource subscription associated with the at least one electronic message based on the message metadata of each electronic message; determining, by the at least one processor, a record similarity value for each user activity record of at least one user activity record in a activity record set based at least in part on a measure of similarity between the originating entity and each activity record of the at least one user activity record; utilizing, by the at least one processor, an engagement model to determine an engagement score indicative of a degree of user engagement with the originating entity based at least in part on the at least one user activity, where the engagement model includes model parameters trained according to a date associated with the at least one user activity record to generate a prediction indicative of the degree of user engagement; determining, by the at least one processor, an unsubscribe condition based at least in part on the engagement score being below a threshold engagement score; and automatically generating, by the at least one processor, an unsubscribe command in response to the unsubscribe condition causing the active electronic resource subscription to be cancelled by removing a user's electronic address from the active electronic resource subscription.

In some embodiments, the present disclosure provides an exemplary technically improved computer-based system that includes at least the following components of at least one processor in communication with a network. The at least one processor is configured to implement instructions to perform steps to: receive at least one electronic message from at least one originating device associated with an originating entity; extract message metadata associated with each electronic message of the at least one electronic message; determine a active electronic resource subscription associated with the at least one electronic message based on the message metadata of each electronic message; track at least one user interaction command associated with at least one user interaction with the at least one electronic message; determine a record similarity value for each user activity record of at least one user activity record in a activity record set based at least in part on a measure of similarity between the originating entity and each activity record of the at least one user activity record; utilize an engagement model to determine an engagement score indicative of a degree of user engagement with the originating entity based at least in part on the at least one user activity and the at least one user interaction metric, where the engagement model includes model parameters trained according to a date associated with the at least one user activity record and the at least one user interaction metric to generate a prediction indicative of the degree of user engagement; determine an unsubscribe condition based at least in part on the engagement score being below a threshold engagement score; and automatically generate an unsubscribe command in response to the unsubscribe condition causing the active electronic resource subscription to be cancelled by removing a user's electronic address from the active electronic resource subscription.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
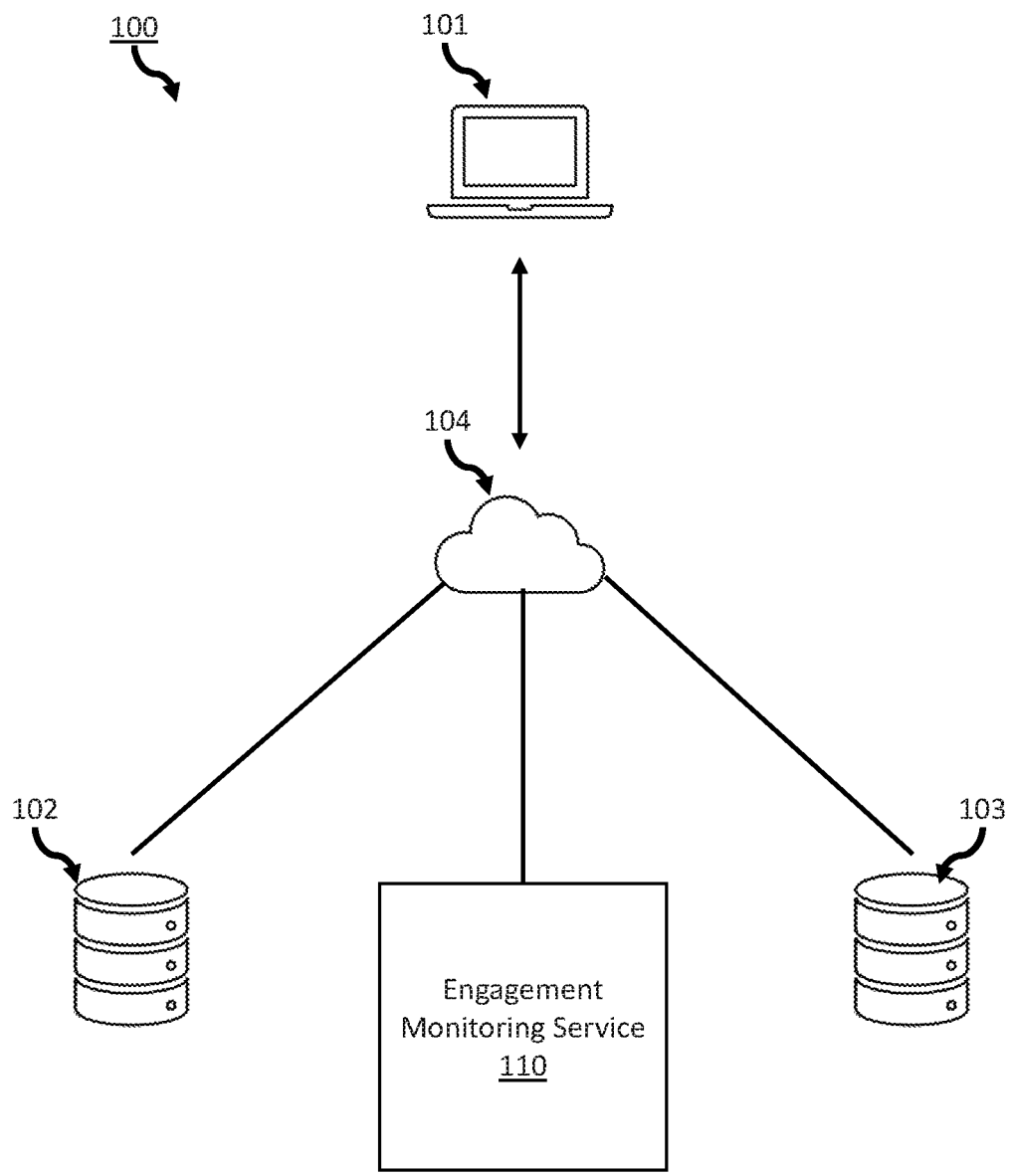
FIGS. 1-7 show one or more schematic flow diagrams, certain computer-based architectures, and/or screenshots of various specialized graphical user interfaces which are illustrative of some exemplary aspects of at least some embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

FIGS. 1 through 7 illustrate systems and methods of electronic message subscription management using user activity tracking. The following embodiments provide technical solutions and technical improvements that overcome technical problems, drawbacks and/or deficiencies in the technical fields involving electronic message management including email subscription list management. As explained in more detail, below, technical solutions and technical improvements herein include aspects of improved online tools for tracking user activities to correlate those activities with electronic subscription services and managing the associated subscriptions automatically in response to the user activities for improved subscribe and unsubscribe controls to online subscription services. Based on such technical features, further technical benefits become available to users and operators of these systems and methods. Moreover, various practical applications of the disclosed technology are also described, which provide further practical benefits to users and operators that are also new and useful improvements in the art.

FIG. 1 is a block diagram of an exemplary computer-based system for automated electronic subscription management in accordance with one or more embodiments of the present disclosure.

In some embodiments, an automated electronic subscription management system 100 helps customers automatically unsubscribe from message origination entities, such as merchants and other subscription employing entities, with which the user is no longer actively engaging. In some embodiments, the system may do so by employing authorized access to electronic message accounts, such as, e.g., OAuth, or other authorization mechanisms. In some embodiments, the accounts can include, e.g., email, internet chat, social media (e.g., Facebook, Twitter, Instagram, LinkedIn, etc.), or other electronic messaging accounts where users may be subscribed to messaging or notification lists. Using this access, the system may parse the messages or notifications to determine which entities have sent subscription list data. In some embodiments, the system may monitor the user's engagement with the entity via engagement through the messaging or notification client as well as monitoring other user activities independent from electronic messaging and the subscription. For example, the user activities can include whether the user is purchasing goods, services or both from the entity or visiting locations associated with the entity. These activities may be first party (e.g., a particular financial account entity that is operating the system, such as a bank), or external activities by other financial systems. After a certain time threshold, if the user is neither engaging with the messages or other notifications, transacting with the entity or otherwise conducting activities that engage with the entity, the system may automatically unsubscribe the user from the entity's subscription list. The unsubscribe command can be performed via application programming interface (API) by sending an API call to the entity device or entity system associated with the entity, or using the authorized access to trigger an unsubscribe link in the electronic message contents. In some embodiments, the unsubscribe mechanism may employ a browser extension or back-end processing. In some embodiments, automated scripts may run to complete the unsubscribe processor, for example, where a page requires the selection of the messages from which to unsubscribe.

In some embodiments, a user at a user computing device 101 can connect to the automated electronic subscription management system 100 for automated subscription management, e.g., via a network 104. In some embodiments, the user computing device 101 can include a computing device suitable for engaging with electronic messages, such as, e.g., email, social media, social media direct messages, internet chat messages, distributed network chat messages, SMS messages, MMS messages, among others and combinations thereof. Accordingly, the user computing device 101 can include, e.g., a personal computer, laptop computer, desktop computer, mobile computing device including a smartphone or tablet, a cellular telephone, a network client device or terminal, among other computing devices for electronic messaging applications and combinations thereof.

In some embodiments, the network 104 may include a suitable networking protocol and infrastructure for interconnecting the automated electronic subscription management system 100 with the user computing device 101, among other devices, such as an electronic messaging service 102, a transaction activity service 103, an engagement monitoring service 110, among other services and systems for the automated electronic subscription management system 100. Accordingly, the network 104 may include, e.g., wired networking infrastructure (e.g., fiber optic, cable, ethernet, among others and combinations thereof) or wireless network infrastructure (e.g., WiFi, Bluetooth, ZigBee, Z-Wave, cellular network such as GSM, CDMA, 4G LTE, 5G, among others and combinations thereof), or a combination of wired and wireless infrastructure. Any suitable protocol may be employed to implement connections on the network 104, such as, e.g., the Internet protocol (IP), transmission connect protocol (TCP), direct connection, or any other networking technology and protocol.

In some embodiments, the user computing device 101 may connect to the automated electronic subscription management system 100 using hardware or software mechanisms, or both, for enabling the automated electronic subscription management system 100 to access and process the electronic messages associated with the user of the user computing device 101. In some embodiments, this may include, e.g., an application extension for the application used to engage with the electronic messages, where the application extension links to the automated electronic subscription management system 100. In some embodiments, the application extension may include, e.g., a browser extension, application plug-in, or other extension to access and parse electronic messages for management by the automated electronic subscription management system 100.

In some embodiments, an account used to engage with the electronic messages may be linked to the automated electronic subscription management system 100 such that the automated electronic subscription management system 100 may manage subscriptions even when the user computing device 101 is turned off or not connectable. In some embodiments, the link may be formed by, e.g., providing authorized access to the account by the automated electronic subscription management system 100. For example, the user may enable account access by the automated electronic subscription management system 100 using an, e.g., OAuth authorization, or other open access or open authorization mechanism.

In some embodiments, the subscriptions may include any electronic message subscription for the regular provision of electronic resources. For example, the subscription can include a messaging subscription for, e.g., deals and sales at a particular store, brand, merchant, mall, or other entity. However, the subscription can also include a subscription for social media content, streaming media content, streaming or cloud services, Internet-of-Things (IoT) services, among other messaging and service subscriptions. In some embodiments, the subscription management system 100 may enable to user to better manage their active electronic resource subscriptions such that messages and service may be automatically continued or cancelled based on engagement.

In some embodiments, the automated electronic subscription management system 100 may include the engagement monitoring service 110, the electronic messaging service 102 and user activity service 103 connected via the network 104. In some embodiments, the engagement monitoring service 110 can include, e.g., a third-party service independent from the electronic messaging service 102 and the transaction activity service 103. Accordingly, the user may provide authorized access as described above to both the electronic messaging service 102 and the user activity service 103. For example, a third-party budgeting application may access the user activity service 103 to analyze transaction activities including spending. Such applications include, for example, Intuit Mint, or other similar products. Such applications may incorporate the engagement monitoring service 110 as another feature of transaction and spending analysis. However, in some embodiments, the engagement monitoring service 110 may be provided by the third-party in any suitable way, such as a stand-alone application for the computing device 101, as a back-end service, via a web application, with or without additional features.

However, in some embodiments, the engagement monitoring service 110 may be provided in tandem with the user activity service 103. Thus, the user activity service 103 provider, such as a bank, credit union, credit card company, payment service platform, GPS or location check-in services, social media, or other first party activity tracking entity, may leverage first-party access to activity information and activity records to inform subscription list engagement via actual engagement, such as with user spending behaviors.

Thus, in some embodiments, whether the engagement monitoring service 110 is a first-party or a third-party software service, a user's activity log with activities recorded by the user activity service 103 may be linked to the user's electronic message account at the electronic message service 102 via the engagement monitoring service 110. As a result, the engagement monitoring service 110 may use both transaction activities and transaction records as well as electronic message engagement to determine a user's level of engagement with an originator of each electronic message subscription in a subscription.

In some embodiments, each of the electronic message service 102, the user activity service 103 and the engagement monitoring service 110 can include, e.g., any suitable combination of hardware and software. In some embodiments, the hardware can include, e.g., processing devices or processing systems, such as one or more, e.g., central processing units (CPUs), graphical processing units (GPUs), neural processing units (NPUs), application specific integrated circuits (ASICs), field programmable gate arrays (FPGAs), microprocessors, and combinations thereof. In some embodiments, the software can include, e.g., one or more software programs, artificial intelligence or machine learning algorithms, messaging protocols, application programming interfaces (APIs), among others and combinations thereof. In some embodiments, each service may be implemented with any suitable combination of front-end and back-end functionality, including, e.g., in a server, a system of servers, as a cloud service, in a distributing processing system or distributed network, using one or more databases or a distributed database, as a local application at the user computing device 101, as a web application or browser extension, among other implementation architectures.

In some embodiments, the engagement monitoring service 110 is implemented such that the engagement monitoring service 110 may communicate with each of the electronic messaging service 102 and the user activity service 103, e.g., via the network 104. As such, the engagement monitoring service 110 may ingest the electronic messages received by the user computing device 101 or an account associated with the user computing device 101 via the electronic messaging service 102. The engagement monitoring service 110 may then determine for each message whether each message originates from a subscription. In some embodiments, the engagement monitoring service 110 may, e.g., analyze metadata, message contents or both for each message to infer an associated message subscription, such as, e.g., an associated list-serve, a known subscription associated with the sender of the message, text or content correlated with, e.g., newsletters, advertisements, or other indications of a subscription, among other message characteristics. In some embodiments, the engagement monitoring service 110 may utilize a combination of logic-based and machine learning-based algorithms for identifying message characteristics indicated of a subscription. Upon identifying an electronic message associated with an electronic message subscription, the engagement monitoring service 110 may update a subscription list associated with the user's account listing all subscriptions detected according to originating entity (e.g., the merchant, brand, publication, or other originating entity with which the subscription is associated).

In some embodiments, the engagement monitoring service 110 may monitor the user's behavior relative to the electronic messages attributable to a subscription, as well as the user's behavior relative to the originating entity via the user activity service 103. Accordingly, in some embodiments, the engagement monitoring service 110 may track, e.g., user click rates tracking how often the user selects links within the contents of each electronic message attributable to a subscription, user viewing times tracking how long a user spends viewing each electronic message attributable to a subscription, whether the user deletes, archives, saves or forwards each electronic message attributable to a subscription, among other user activities relative to each electronic message, and combinations thereof. In some embodiments, the engagement monitoring service 110 may utilize the electronic message activities to determine user engagement with electronic messages from each subscription in the subscription list.

In some embodiments, the engagement monitoring service 110 may, additionally or alternatively, monitor the user records recorded by the user activity service 103 to determine use engagement with each originating entity in the subscription. For example, the engagement monitoring service 110 may match transaction records to each originating entity, e.g., according to name, to measure the user's degree of interest in the originating entity's products or services. Thus, the engagement monitoring service 110 may measure the user's interest in the originating entity, and therefore, the user's interest in electronic messages attributable to subscriptions to the originating entity.

In some embodiments, based on the electronic message engagement and the user activity engagement, the engagement monitoring service 110 may determine a relevance of each subscription in the list of subscriptions to the user. In some embodiments, where the relevance according to engagement falls below a threshold, the engagement monitoring service 110 may automatically determine which subscriptions in the subscription list to unsubscribe from. In some embodiments, the engagement monitoring service 110 may, e.g., provide an alert to the user at the user computing device 101 to unsubscribe from particular subscriptions having low relevance, provide a user interface element enabling the user to the select the element and unsubscribe from the particular subscriptions, or automatically unsubscribe the user from the particular subscriptions, or a combination thereof. Thus, upon determining relevance, the engagement monitoring service 110 may provide automated functionality for electronic message subscription management.

Figure 2:
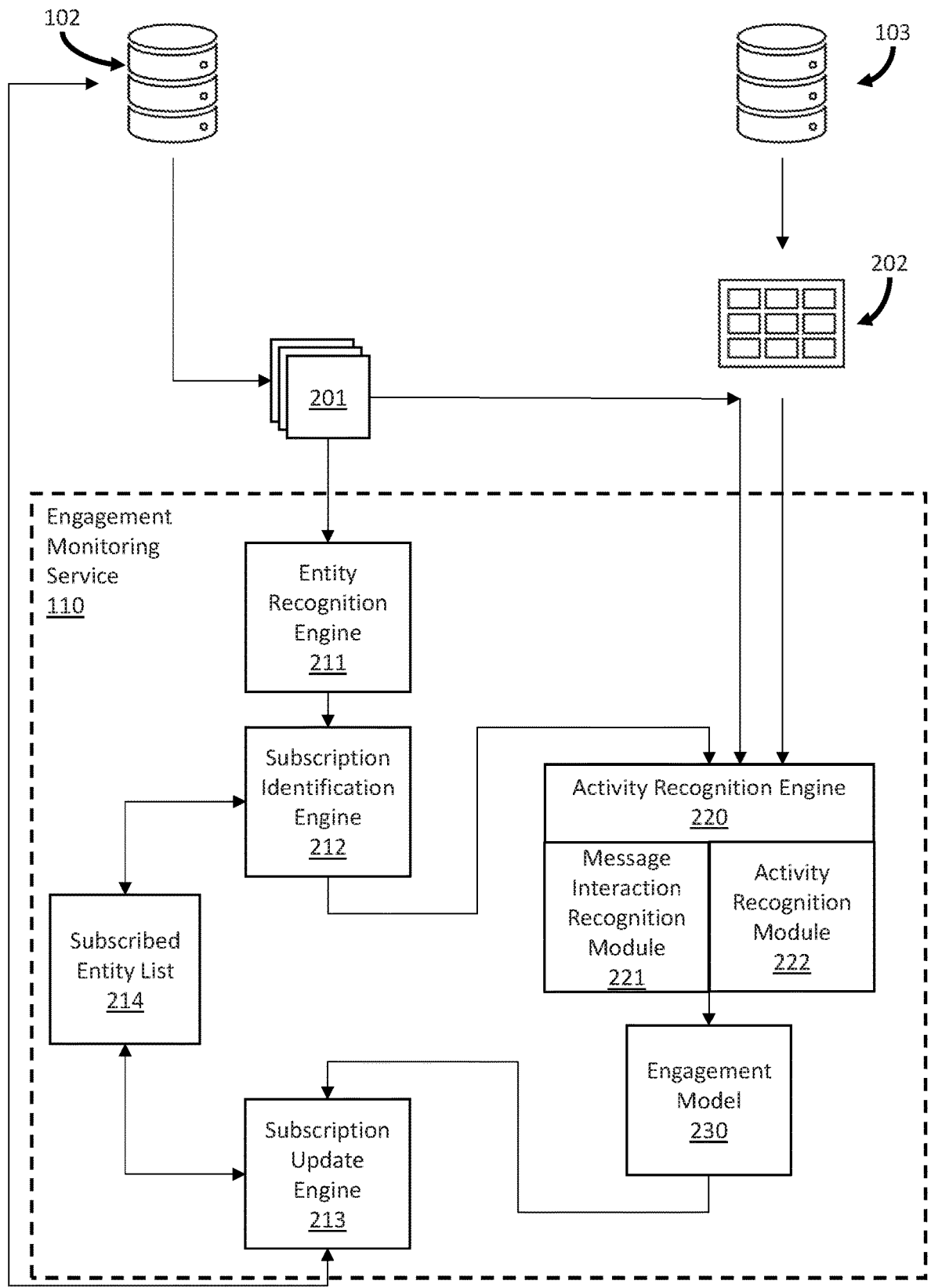

FIG. 2 is a block diagram of another exemplary computer-based system for engagement recognition and monitoring for automated electronic subscription management in accordance with one or more embodiments of the present disclosure.

In some embodiments, the engagement monitoring service 110 ingests each electronic message 201 and activity records 202 to determine user engagement with subscriptions and manage a subscribed entity list 214. Accordingly, the engagement monitoring service 110 may receive electronic messages 201 from the electronic messaging service 102 and the activity records 202 from the user activity service 103.

In some embodiments, the engagement monitoring service 110 includes an entity recognition engine 211 to determine the originating entity associated with each electronic message 201. In some embodiments, the entity recognition engine 211 may parse and analyze, e.g., message data, metadata, contents, and other attributes to automatically determine an entity associated with the sending of the electronic message. For example, in some embodiments, the entity recognition engine 211 may identify sender metadata according to metadata tags, such as, e.g., an email address of the sender, a phone number of the sender of a text message, or other account handle of the originating entity responsible for the sending of the message.

In some embodiments, the engagement monitoring service 110 may parse contents of each electronic message 201 identify the originating entity. For example, the engagement monitoring service 110 may leverage contents to recognize, e.g., brands or companies associated with offers presented in an electronic message. For example, where a user is subscribed to department store newsletters for, e.g., sales offers and coupons or other savings opportunities, the engagement monitoring service 110 may identify brands or companies of the products sold by the department store. Similarly, where subscriptions are sent by list serves having account handles or other sender identifiers different from the name of the originating entity, the engagement monitoring service 110 may utilize a recognition of the contents to determine the originating entity. Such determination may be used to augment the sender metadata or in place of the sender metadata as an identification of one or more originating entities for each electronic message 201.

In some embodiments, the entity recognition engine 211 may employ, e.g., natural language processing models, to automatically parse and recognize originating entity identifiers in the contents of each electronic message 201. In some embodiments, the entity recognition engine 211 may employ template techniques to automatically analyze particular portions of each electronic message 201 to identify the originating entity identifier. For example, the formatting of an electronic message 201 may have a known format, such as, e.g., for an email from a known list serve such as, e.g., Mail Chimp™, or other list serve, where the originating entity is identified in a predetermined location of the electronic message contents. In some embodiments, the entity recognition engine 211 may use a combination of natural language processing and template analysis, such as, e.g., by using both templates and natural language processing on each message 201, determining conformance of an electronic message 201 to an existing template and using the existing template, or otherwise using natural language processing, or in any other combination. Accordingly, in some embodiments, the entity recognition engine 211 may identify originating entities associated with each electronic message, even where the sender metadata may not identify the originating entity.

In some embodiments, the metadata or content that may identify the originating entity may include any data indicative of the origination of the electronic message, such as the identity of the originating entity or an originating entity system associated with the originating entity. For example, originating entity data may include, e.g., an originating entity identifier associated with the originating entity, an originating entity website domain associated with a website of the originating entity, an originating entity address associated with a mailing address of the originating entity, an originating entity email address associated with originating entity, among others and a combination thereof. In some embodiments, using the parsing technique (e.g., natural language processing or templating parsing), the entity recognition engine 211 may record the originating entity or entities associated with each electronic message 201 according to a predetermined format, such as, a common format or normalized format for consistency in representation of each unique originating entity.

In some embodiments, a subscription identification engine 212 may employ a subscribed entity list, the identified originating entity and the electronic message 201 to determine whether each electronic message 201 is associated with a subscription. In some embodiments, the subscription identification engine 212 may parse and analyze, e.g., electronic message 201 metadata and content to determine whether each electronic message 201 is a part of a subscription. For example, the subscription identification engine 212 may include a natural language processing model trained to recognize list serves or other subscription indications. However, similar to the entity recognition engine 211, the subscription identification engine 212 may include predefined templates that extract portions of the metadata or content to identify whether a subscription is indicated.

In some embodiments, the subscription identification engine 212 may parse and filter the contents of an electronic message or otherwise search the electronic message for a link (e.g., a Universal Resource Link (URL) or other electronic link). For example, the subscription identification engine 212 may search the message contents for a URL matching a known unsubscribe URL, domain name, format, or other matching attribute to known unsubscribe links. Additionally or alternatively, the subscription identification engine 212 may search the contents for text or character strings matching "unsubscribe" or other words and phrases indicative of an unsubscribe mechanism. For example, the subscription identification engine 212 may maintain a dictionary of character strings and formats for known unsubscribe mechanisms (e.g., a link label of "unsubscribe", or a text string preceding a link that matches an unsubscribe direction such as "unsubscribe here" or other text). Using the detection of an unsubscribe link or other unsubscribe mechanism, the subscription identification engine 212 may infer that the electronic message was sent as part of a subscription to electronic messages from the associated originating entity.

In some embodiments, the subscription identification engine 212 may employ content templates to determine a match of the contents or a format, or both, of an electronic message to a known template in a set of known templates of known message subscriptions. Accordingly, the subscription identification engine 212 may utilize a library of electronic message templates to recognize subscriptions according to the format, placement, text, or other attributes of content in the electronic message.

In some embodiments, the subscription identification engine 212 may simply extract an identifier of the sender, such as, e.g., a sending email address, telephone number, account handle, name or other identifier in, e.g., metadata of the electronic message. The subscription identification engine 212 may then compare the sender against a list of originating entities known to send subscription messages to determine with the electronic message is part of a subscription.

In some embodiments, the subscription identification engine 212 may utilize a machine learning model that may ingest, e.g., content, content format, metadata, among other features of an electronic message to classify the electronic message as a subscription message or a non-subscription message. In some embodiments, the machine learning model may include, e.g., a classifier such as a support vector machine, random forest classifier, convolutional neural network, or other machine learning model for classification. In some embodiments, such a subscription identification model may include model parameters trained against a training dataset of electronic messages labeled according to whether each electronic message of the training dataset originates from a subscription list or not. In some embodiments, the training dataset may be added to with each confirmed subscription electronic message. An electronic message may be confirmed as a subscription message where, e.g., a user confirms unsubscribing from the associated list, or by the user explicitly indicating a particular electronic message as from a subscription (e.g., by adding a subscription flag, by adding the electronic message to a folder of subscriptions, or by some other user action as a user computing device 101), In some embodiments, the subscription identification engine 212 may log electronic messages from multiple computing devices 101 or electronic message service 102 and detect common received electronic messages across user. Where multiple users receive the same or similar electronic message, the subscription identification engine 212 may mark the electronic message of each user as a subscription message.

In some embodiments, one or more the above techniques for subscription identification may be employed. In some embodiments, based on the results of the subscription identification for each electronic message, the subscription identification engine 212 may update the subscribed entity list 214 with any new subscriptions, and the originating entity associated therewith. In some embodiments, the subscribed entity list 214 may include, e.g., a list, table, array or other data structure identifying each subscription detected by the engagement monitoring service 110 and the entity associated therewith. In some embodiments, the subscribed entity list 214 may include a list of the originating entities in a common or normalized format to which the electronic messaging service 102 is subscribed such that the recognized entity may be cross-referenced with known subscriptions identified in the subscribed entity list 214.

For example, where a given electronic message 201 is associated with an originating entity recognized by the entity recognition engine 211 and the given electronic message 201 is associated with a subscription as recognized by the subscription identification engine 212, the subscription identification engine 212 may compare the recognized subscription and entity or entities with the subscribed entity list 214. If the subscribed entity list 214 does not yet include an indication of a subscription to the recognized entity or entities, then the recognized entity or entities may be added to the subscribed entity list 214.

In some embodiments, the originating entity or entities of a received electronic message 201 may then be analyzed for user engagement with the originating entities. In some embodiments, the engagement monitoring service 110 may employ an activity recognition engine 220 for identifying user activities that relate to the originating entities of the received electronic message 201. To do so, the activity recognition engine 220 may include a message interaction recognition module 221 for recognizing any user interactions with the received message to quantify engagement therewith, and an user activity recognition module 222 to leverage the activity records 202 and quantify user engagement with the originating entities outside of electronic messaging.

For example, in some embodiments, the message interaction recognition module 221 may monitor user selections relative to a received electronic message 201, such as, e.g., interaction commands including, e.g., delete commands, message forwarding commands, message archiving or saving commands, selections of links included with the electronic message, and time spent viewing the electronic message before selecting an interaction command, among other selections and behaviors. As such, the message interaction recognition module 221 may employ the user behaviors to generate interaction metrics that represent the user interactions with a given electronic message. For example, the interaction metrics can include a click rate indicative of a number of clicks by the user, an open duration indicative of an amount of time the electronic message remains open, a scroll indicator indicative of an amount of the electronic message that is scrolled through, a reply indicator indicating whether the electronic message is replied to, among others and a combination thereof. The interaction metrics are determined for each electronic message 201 that is associated with a subscription.

In some embodiments, the message interaction recognition module 221 may determine the interaction metrics using, e.g., an application plug-in or extension as the user computing device 101 to monitor the user interactions. In some embodiments, the message interaction recognition module 221 ingest user interactions from the electronic messaging service 102 via authorized access as described above.

In some embodiments, the account activity recognition module 222 may identify matching activity records in the activity records 202 that are associated with the originating entity of an electronic message 201. In some embodiments, the activity records 202 may include, e.g., lists or data entries of credit card transactions, debit transaction, or other financial account transaction record that records transactions with other parties, such as, e.g., merchants.

In some embodiments, the account activity recognition module 222 may extract a merchant or other entity associated with each activity record 202 according to, e.g., an entity identifier represented in the activity record 222. For example, where the activity is a financial transaction between the user and a merchant, each activity record 202 may include a payer entity identifier and a payee entity identifier, as well as a quantity and date. Thus, using, e.g., a template-based parsing technique to parse the activity records 202, the account activity recognition module 222 may extract the entities identified in each activity and determine a similarity between each entity of each activity record to the originating entity or entities of a particular electronic message 201. In some embodiments, the similarity value can include a comparison between the entity identifiers and the originating entity identifiers based on a similarity of the text. For example, the account activity recognition module 222 may employ, e.g., a Jaccard distance, Euclidean distance, cosine similarity, or other text similarity metric.

However, in some embodiments, the similarity may be measured as a percent match, such as, e.g., a match percentage indicating a percent confidence that the originating entity matches the entity of the activity record 202 based at least in part on a comparison of the entity data with the originating entity data. In some embodiments, the entity data may comprise any data associated with an entity of the activity record 202. For example, the account activity recognition module 222 may extraction entity data from the activity record 202, including an entity identifier associated with the entity, an entity website domain associated with a website of the entity, an entity address associated with a mailing address of the entity, an entity email address associated with entity, among others and a combination thereof. The match percentage can include a similarity value representative of an aggregation of a similarity between each entity data item with each originating entity data item described above.

In some embodiments, where the similarity value between the originating entity and the activity entity is greater than a predetermined threshold, the user activity recognition module 222 may determine that the entities match, thus indicating engagement with the originating entity. For example, where the similarity value is greater than, e.g., about 0.5, about 0.6, about 0.7, about 0.8, about 0.9, or other suitable similarity threshold for, e.g., cosine similarity or other similarity measure where a greater value indicates greater similarity, the entities may be deemed to match. However, for, e.g., Euclidean distance, or other measures where a lower number (closer distance) indicates increased similarity, a similarity value that is less than about, e.g., 0.5, 0.4, 0.3, 0.2, or 0.1, the entities may be deemed to match.

In some embodiments, where matches are determined between an electronic message 201 and activity records 202 based on the similarity between associated entities, the account activity recognition module 222 may extract activity data from each matching activity record 202, such as, e.g., the activity quantity, the activity date, among other data.

In some embodiments, the activity data of matching activity records 202 and the user interaction metrics for each electronic message 201 associated with a subscription may be passed to an engagement model 230 to determine an engagement score indicative of the degree of user engagement with the originating entity or entities. In some embodiments, the engagement model 230 employs model parameters, such as weights and activation functions that have been trained to determine a strength of engagement based on feature inputs including the date of a matching activity, the quantity of the matching activity, and each interaction metric. Based on these inputs and a training dataset with ground truth engagement labels, the engagement model 230 may have parameters trained to predict the engagement score for each new electronic message 201 associated with a subscription. In some embodiments, the engagement score indicates a degree of engagement between the user and the originating entity or entities based on interactions with message from the originating entities as well as purchases or other financial engagement with the originating entity or entities.

In some embodiments, the engagement engine 230 may be configured to utilize one or more exemplary AI or machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

i) Define Neural Network architecture/model,
  ii) Transfer the input data to the exemplary neural network model,
  iii) Train the exemplary model incrementally,
  iv) determine the accuracy for a specific number of timesteps,
  v) apply the exemplary trained model to process the newly-received input data,
  vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values, functions and aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, a subscription update engine 213 may utilize the engagement score to automatically manage subscriptions of the electronic message account of the electronic messaging service 102. For example, the subscription update engine 213 may receive the engagement score and determine whether an unsubscribe condition has been met. In some embodiments, an unsubscribe condition can include, e.g., a threshold or other condition for determining whether the engagement score indicates whether the user currently engages with the originating entity. For example, the threshold can include a threshold engagement score of about, e.g., 0.5, 0.6, 0.7, 0.8 or 0.9, where if the engagement score falls below the threshold engagement score, the subscription update engine 213 may automatically determine that an unsubscribe condition has been met.

In some embodiments, once an unsubscribe condition has been met, the subscription update engine 213 may automatically facilitate unsubscribing from electronic message subscriptions associated with the originating entity by, e.g., automatically issuing an unsubscribe command in response to the unsubscribe condition causing the list subscription to be cancelled by removing a user's electronic address from the list subscription. For example, in some embodiments, the subscription update engine 213 may instruct the electronic messaging service 102 to issue, e.g., an API request associated with unsubscribing from the subscription to the associated list serve. However, where the subscription does not have an associated unsubscribe API, the subscription update engine 213 may parse an associated electronic message 201 to identify an unsubscribe link, e.g., using template-based parsing or natural language processing to recognize the unsubscribe link. For example, by comparing the contents of the electronic message with content structure of known subscription electronic messages, the subscription update engine 213 may automatically identify the unsubscribe link and automatically select the unsubscribe link.

In some embodiments, the subscription update engine 213 may then issue an unsubscribe command including visiting the unsubscribe link destination on behalf of the user and initiate the unsubscribe process. For example, the subscription update engine 213 may include form autofill templates to identify and fill fields of an unsubscribe page associated with a subscription to autofill the user's information and unsubscribe from the subscription.

However, in some embodiments, some unsubscribe links have automated system protections that prevent automated access to the destination of the link. Thus, the subscription update engine 213 may instead surface a message, e.g., via a pop-up, browser extension notification, electronic message, or other form of alert, to notify the user of the subscription that is no longer being engaged with (e.g., irrelevant to the user). The message may include an indication of the subscription, associated originating entity, and unsubscribe link to facilitate the user's unsubscribe interaction.

In some embodiments, upon detection of the unsubscribing of the user from a subscription, the subscription update engine 213 may remove the subscription and originating entity from the subscription list 214 to update the log of subscriptions.

Figure 3:
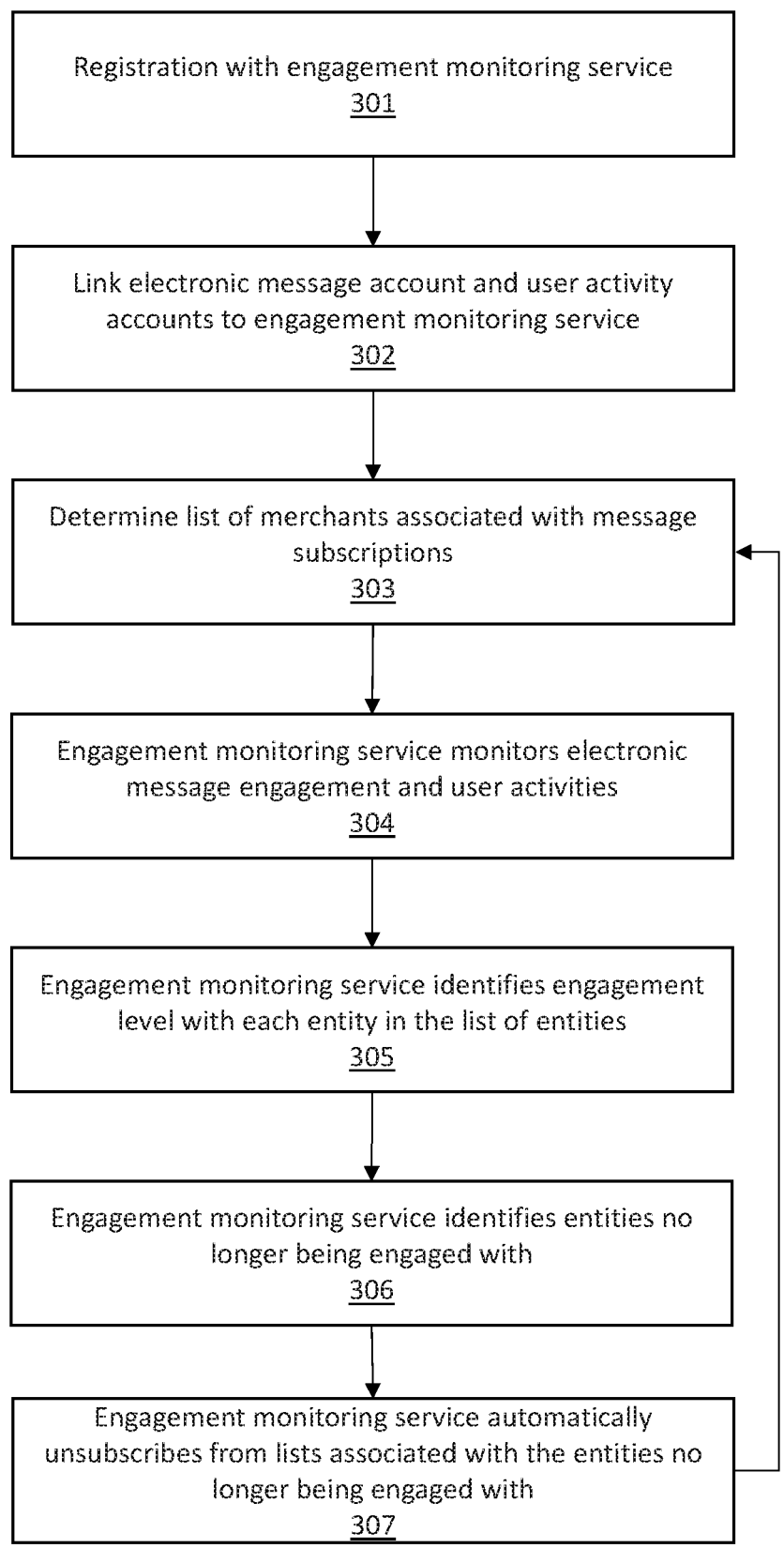

FIG. 3 illustrates a flowchart of an illustrative methodology in accordance with one or more embodiments of the present disclosure.

In some embodiments, for automated electronic message subscription monitoring and management, a user may register with an engagement monitoring service at block 301. For example, in some embodiments, the user may provide authorized access to an electronic messaging account and a user activity account for the engagement monitoring service at block 302. Thus, the engagement monitoring service may determine user engagement with entities of electronic message subscriptions according to interactions with messages and activities with the entities.

In some embodiments, a list of entities associated with mailing list subscriptions of the user's electronic messaging account may be determine at block 303. For example, the engagement monitoring service may analyze each electronic message to identify the messages that are attributable to a subscription, and the originating entity of the subscription. In some embodiments, the engagement monitoring service may automatically determine the list using, e.g., entity recognition and subscription recognition techniques, including natural language processing and template matching algorithms.

In some embodiments, the engagement monitoring service may monitor the user's engagement with the electronic messages of each subscription and activities with the originating entity of each subscription at block 304. In some embodiments the engagement with the electronic message includes the tracking of various interaction metrics as described above.

Based on the tracked electronic message engagement and activities relative to each subscription, the engagement monitoring service may identify the user's engagement level with the originating entity at block 305. For example, the engagement monitoring service may employ an engagement model including machine learning algorithms for correlating engagement with the interaction metrics and activities to infer an engagement level. Where the engagement level falls below a threshold level, the engagement monitoring service may determine that the entity is no longer relevant to the user at block 306. As such, the engagement monitoring service may determine an engagement score as a measure of the engagement level, such that the engagement score falling below a threshold engagement score for a given merchant indicates a subscription that is no longer relevant to the user.

In some embodiments, the engagement monitoring service may automatically unsubscribe the user from all subscriptions associated with each entity with which the user no longer engages at block 307. For example, the engagement monitoring service may issue an unsubscribe command, e.g., via API call, to the list serve managing a particular subscription, via identification, extraction and visitation of an unsubscribe link in the body of an electronic message of the particular subscription such that the engagement monitoring service autofills the field for unsubscribing on behalf of the user, or via identification, extraction and provision of the unsubscribe link to the user to facilitate user unsubscription. In some embodiments, once the user is unsubscribed, the engagement monitoring service may notify the user of the unsubscription and update the list of entities and mailing list subscriptions to remove the unsubscribed mailing list subscription.

Figure 4:
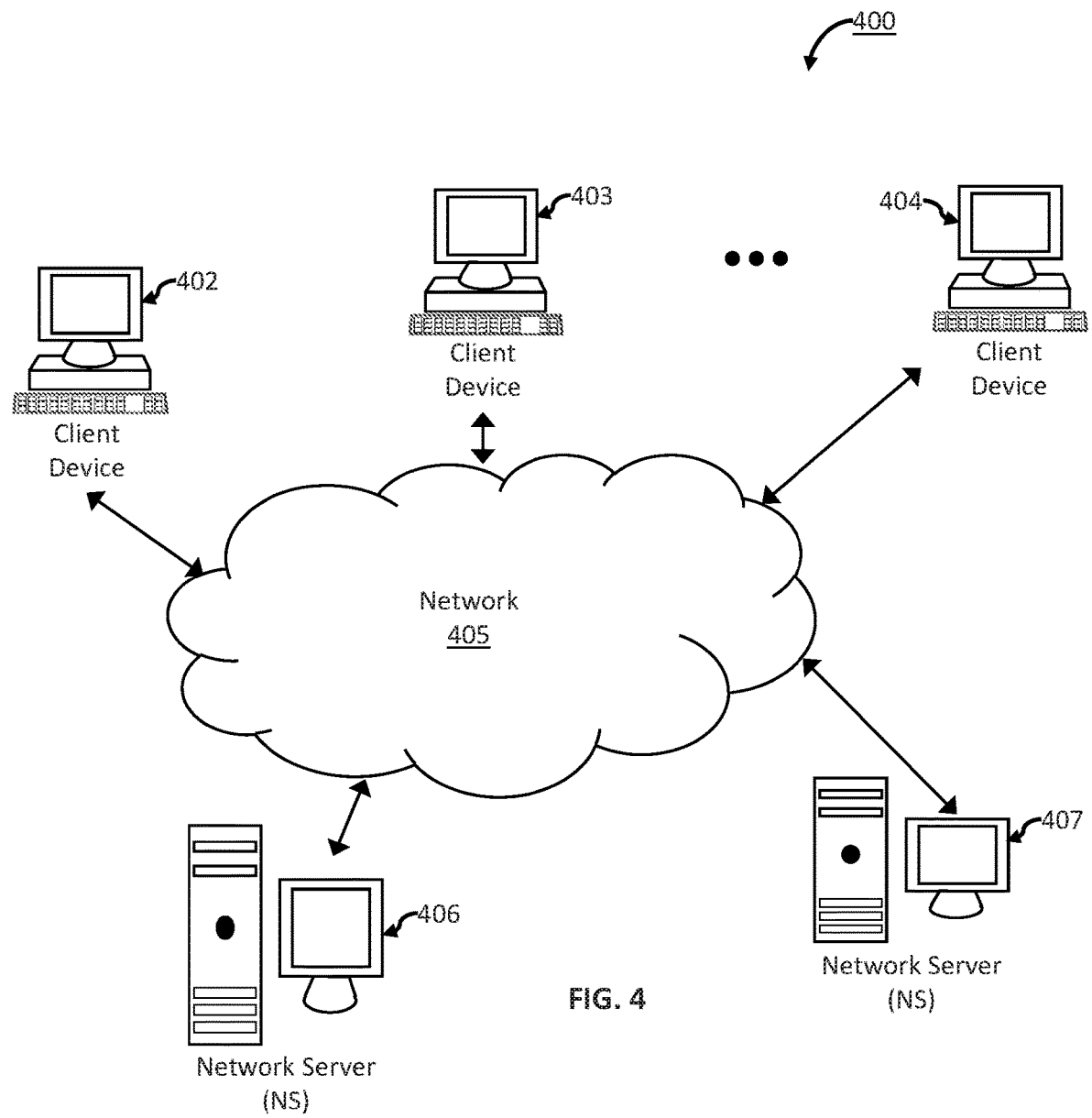

FIG. 4 depicts a block diagram of an exemplary computer-based system and platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and the illustrative computing components of the exemplary computer-based system and platform 400 may be configured to manage a large number of members and concurrent transactions, as detailed herein. In some embodiments, the exemplary computer-based system and platform 400 may be based on a scalable computer and network architecture that incorporates varies strategies for assessing the data, caching, searching, and/or database connection pooling. An example of the scalable architecture is an architecture that is capable of operating multiple servers.

In some embodiments, referring to FIG. 4, members 402-404 (e.g., clients) of the exemplary computer-based system and platform 400 may include virtually any computing device capable of receiving and sending a message over a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may include may run one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 4, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 5:
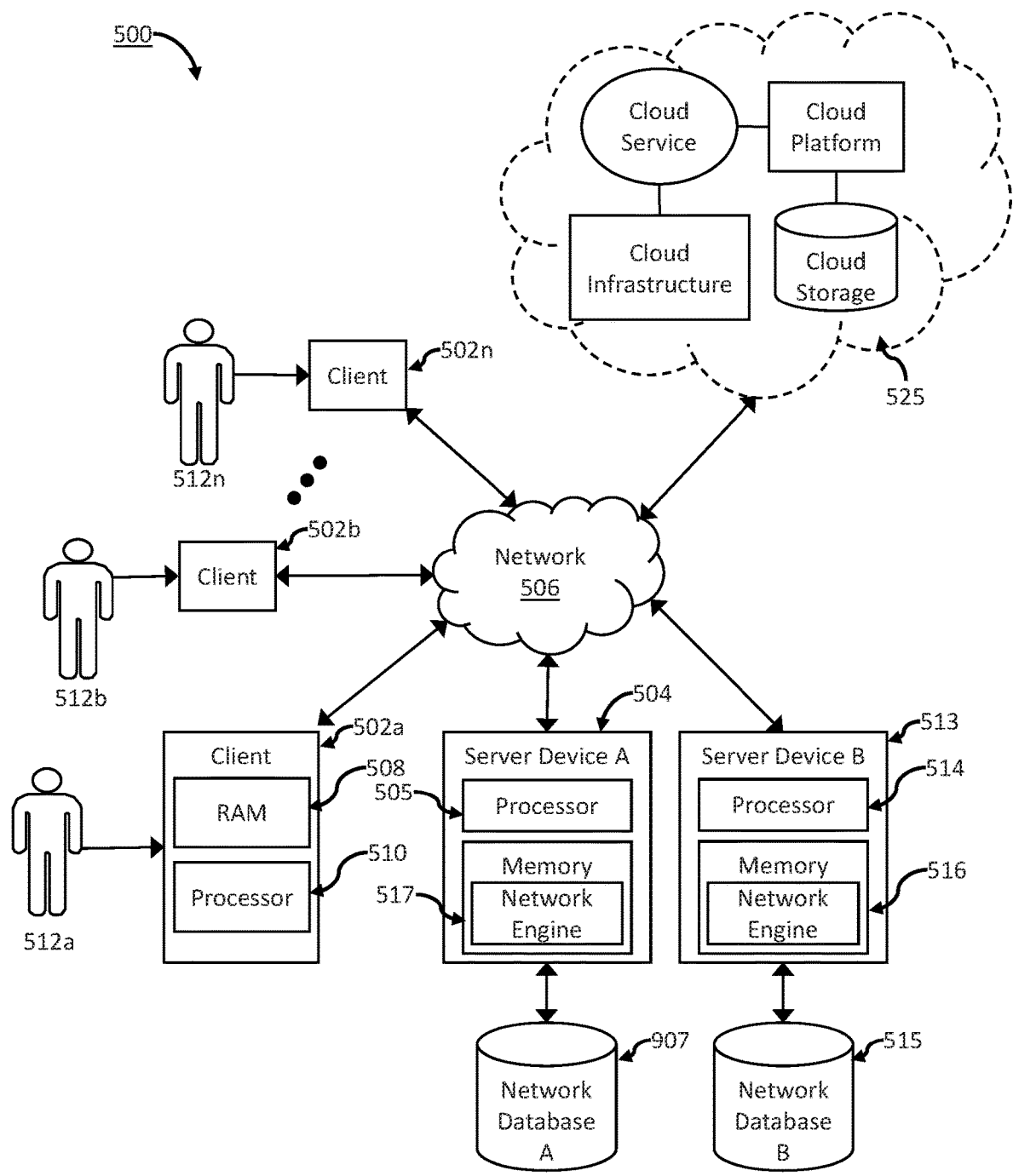

FIG. 5 depicts a block diagram of another exemplary computer-based system and platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502a, 502b thru 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502a through 502n may also comprise a number of external or internal devices such as a mouse, a CD-ROM, DVD, a physical or virtual keyboard, a display, or other input or output devices. In some embodiments, examples of member computing devices 502a through 502n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a through 502n may be specifically programmed with one or more application programs in accordance with one or more principles/methodologies detailed herein. In some embodiments, member computing devices 502a through 502n may operate on any operating system capable of supporting a browser or browser-enabled application, such as Microsoft™ Windows™, and/or Linux. In some embodiments, member computing devices 502a through 502n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502a through 502n, users, 512a through 502n, may communicate over the exemplary network 506 with each other and/or with other systems and/or devices coupled to the network 506. As shown in FIG. 5, exemplary server devices 504 and 513 may be also coupled to the network 506. In some embodiments, one or more member computing devices 502a through 502n may be mobile clients.

In some embodiments, at least one database of exemplary databases 507 and 515 may be any type of database, including a database managed by a database management system (DBMS).

In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
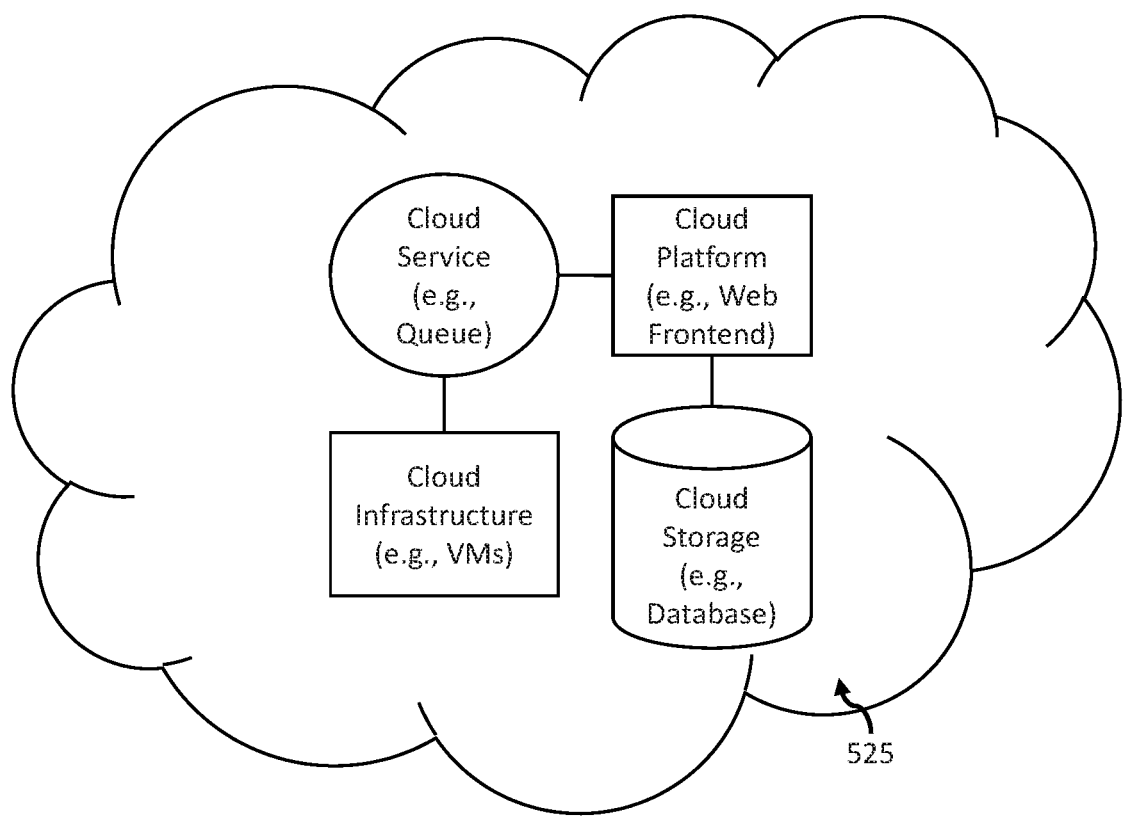
Figure 7:
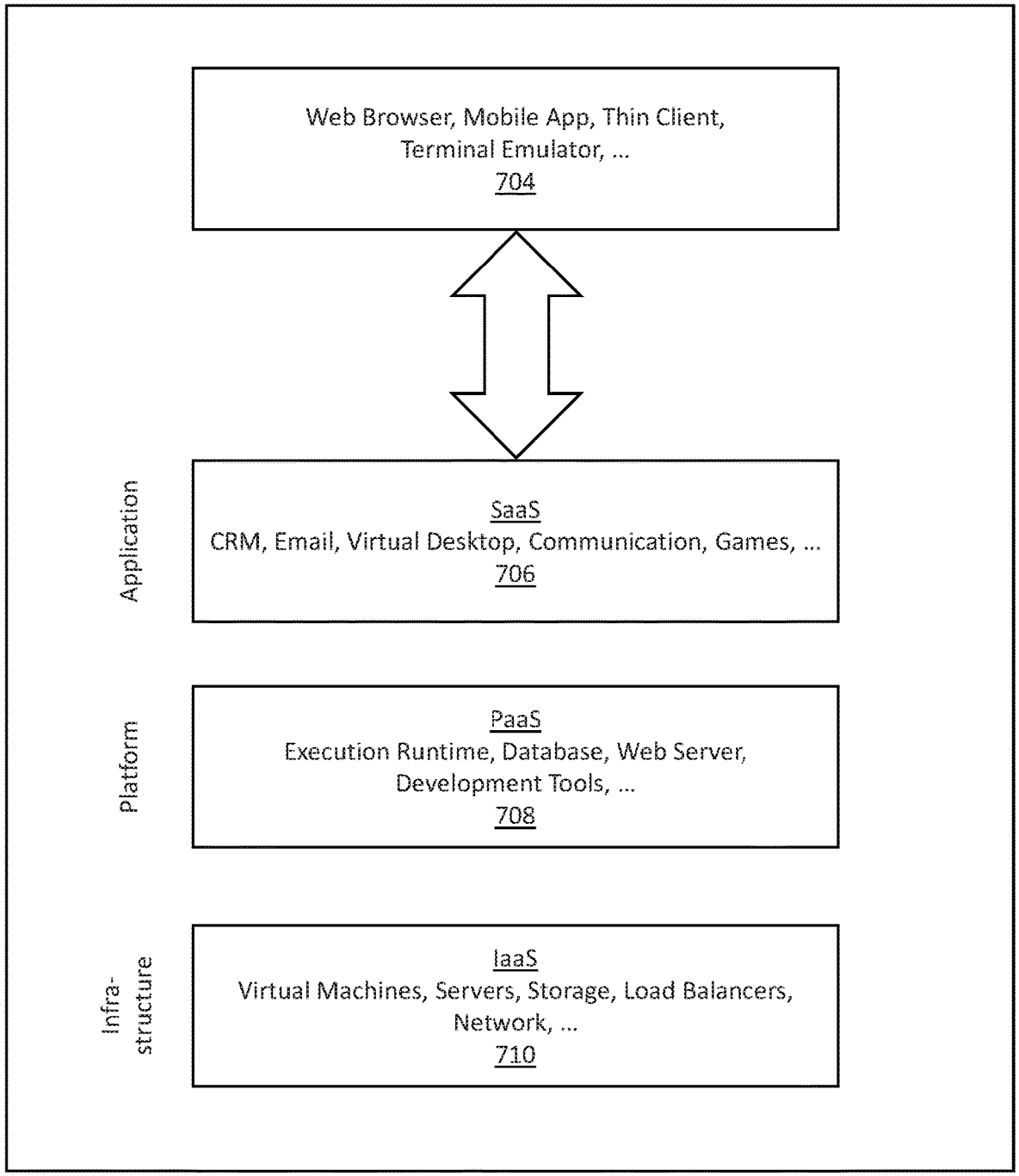

In some embodiments, the exemplary inventive computer-based systems/platforms, the exemplary inventive computer-based devices, and/or the exemplary inventive computer-based components of the present disclosure may be specifically configured to operate in a cloud computing/architecture 525 such as, but not limiting to: infrastructure a service (IaaS) 710, platform as a service (PaaS) 708, and/or software as a service (SaaS) 706 using a web browser, mobile app, thin client, terminal emulator or other endpoint 704. FIGS. 6 and 7 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

In some embodiments, exemplary inventive, specially programmed computing systems and platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems or platforms of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some embodiments, as detailed herein, one or more of the computer-based systems of the present disclosure may be implemented across one or more of various computer platforms such as, but not limited to: (1) Linux, (2) Microsoft Windows, (3) OS X (Mac OS), (4) Solaris, (5) UNIX (6) VMWare, (7) Android, (8) Java Platforms, (9) Open Web Platform, (10) Kubernetes or other suitable computer platforms. In some embodiments, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems or platforms of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device, system or platform of the present disclosure and any associated computing devices, based at least in part on one or more of the following techniques and devices, without limitation: accelerometer(s), gyroscope(s), Global Positioning Systems (GPS); GPS accessed using Bluetooth™; GPS accessed using any reasonable form of wireless and non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems or platforms of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

The aforementioned examples are, of course, illustrative and not restrictive.

At least some aspects of the present disclosure will now be described with reference to the following numbered clauses.

1. A method comprising:
  receiving, by at least one processor, at least one electronic message from at least one originating device associated with an originating entity;
  extracting, by the at least one processor, message metadata associated with each electronic message of the at least one electronic message;
  determining, by the at least one processor, an active electronic resource subscription associated with the at least one electronic message based on the message metadata of each electronic message;
  tracking, by the at least one processor, at least one user interaction command associated with at least one user interaction with the at least one electronic message;
  determining, by the at least one processor, a record similarity value for at least one user activity record in an activity log based at least in part on a measure of similarity between the originating entity and each activity record of the at least one user activity record;
  utilizing, by the at least one processor, an engagement model to determine an engagement score indicative of a degree of user engagement with the originating entity based at least in part on the at least one user activity and the at least one user interaction metric;
    wherein the engagement model comprises model parameters trained according to a date associated with the at least one user transaction record and the at least one user interaction metric to generate a prediction indicative of the degree of user engagement;
  determining, by the at least one processor, an unsubscribe condition based at least in part on the engagement score being below a threshold engagement score; and
  automatically generating, by the at least one processor, an unsubscribe command in response to the unsubscribe condition to cause the user to be unsubscribed from the active electronic resource subscription.

2. The method of clause 1, further comprising matching, by the at least one processor, a merchant identifier of the at least one activity record to an originating entity identifier of the at least one electronic message associated with the originating entity using a template parser to convert the originating entity identifier to a common identifier format associated with the activity record set.

3. The method of clause 1, further comprising utilizing, by the at least one processor, a natural language processing model to extract an originating entity identifier from the at least one electronic message to a common identifier format associated the activity record set; and
  matching, by the at least one processor, a merchant identifier of the at least one activity record to the originating entity identifier.

4. The method of clause 1, wherein the at least one originating device comprises an electronic message list serve provider.

5. The method of clause 1, further comprising utilizing, by the at least one processor, one or more electronic resource subscription recognition models to identify the originating entity, an unsubscribe mechanism and the originating system.

6. The method of clause 1, further comprising:
  extracting, by the at least one processor, merchant data from the at least one activity record;
    wherein the merchant data comprises:
      i) a merchant identifier associated with the merchant,
      ii) a merchant website domain associated with a website of the merchant,
      iii) a merchant address associated with a mailing address of the merchant,
      iv) a merchant email address associated with merchant, or
      v) a combination thereof;
  extracting, by the at least one processor, originating entity data from the at least one electronic message;
    wherein the originating entity data comprises:
      i) a originating entity identifier associated with the originating entity,
      ii) a originating entity website domain associated with a website of the originating entity,
      iii) a originating entity address associated with a mailing address of the originating entity,
      iv) a originating entity email address associated with originating entity, or
      v) a combination thereof;
  determining, by the at least one processor, a match percentage indicating a percent confidence that the originating entity matches the merchant based at least in part on a comparison of the merchant data with the originating entity data; and
  determining, by the at least one processor, that the at least one activity record is associated with the originating entity where the match percentage is greater than a match threshold.

7. The method of clause 1, further comprising identifying, by the at least one processor, the electronic resource subscription based at least in part on comparing contents of the at least one electronic message with a list of content indicative of known mailing lists to finding a matching known mailing list.

8. The method of clause 7, further comprising identifying, by the at least one activity record, an unsubscribe mechanism associated with the active electronic resource subscription based on an unsubscribe template associated with the matching known mailing list.

9. The method of clause 1, wherein the activity record set comprises a activity list in a credit account associated with the user.

10. The method of clause 1, further comprising:
tracking, by the at least one processor, the at least one user interaction metric using an application extension associated with a software application for interacting with the at least one electronic message; and
wherein the at least one user interaction metric comprises:
  i) a click rate indicative of a number of clicks by the user per electronic message of the at least one electronic message,
  ii) an open duration indicative of an amount of time each electronic message of the at least one electronic message remains open,
  iii) a scroll indicator indicative of an amount of each electronic message of the at least one electronic message that is scrolled through,
  iv) a reply indicator indicating whether each electronic message of the at least one electronic message is replied to, or
  v) a combination thereof.

11. A method comprising:
receiving, by at least one processor, at least one electronic message from at least one originating device associated with an originating entity;
extracting, by the at least one processor, message metadata associated with each electronic message of the at least one electronic message;
determining, by the at least one processor, a active electronic resource subscription associated with the at least one electronic message based on the message metadata of each electronic message;
determining, by the at least one processor, a record similarity value for at least one user activity record in a activity record set based at least in part on a measure of similarity between the originating entity and each activity record of the at least one user activity record;
utilizing, by the at least one processor, an engagement model to determine an engagement score indicative of a degree of user engagement with the originating entity based at least in part on the at least one user activity;
wherein the engagement model comprises model parameters trained according to a date associated with the at least one user activity record to generate a prediction indicative of the degree of user engagement;
determining, by the at least one processor, an unsubscribe condition based at least in part on the engagement score being below a threshold engagement score; and
automatically generating, by the at least one processor, an unsubscribe command in response to the unsubscribe condition causing the active electronic resource subscription to be cancelled by removing a electronic address associated with a user from the active electronic resource subscription.

12. The method of clause 11, further comprising matching, by the at least one processor, a merchant identifier of the at least one activity record to an originating entity identifier of the at least one electronic message associated with the originating entity using a template parser to convert the originating entity identifier to a common identifier format associated with the activity record set.

13. The method of clause 11, further comprising utilizing, by the at least one processor, a natural language processing model to extract an originating entity identifier from the at least one electronic message to a common identifier format associated the activity record set; and matching, by the at least one processor, a merchant identifier of the at least one activity record to the originating entity identifier.

14. The method of clause 11, wherein the at least one originating device comprises an electronic message list serve provider.

15. The method of clause 11, further comprising utilizing, by the at least one processor, one or more subscription list recognition models to identify the originating entity, an unsubscribe mechanism and the originating system.

16. The method of clause 11, further comprising:
extracting, by the at least one processor, merchant data from the at least one activity record;
wherein the merchant data comprises:
  i) a merchant identifier associated with the merchant,
  ii) a merchant website domain associated with a website of the merchant,
  iii) a merchant address associated with a mailing address of the merchant,
  iv) a merchant email address associated with merchant, or
  v) a combination thereof;
extracting, by the at least one processor, originating entity data from the at least one electronic message;
wherein the originating entity data comprises:
  i) a originating entity identifier associated with the originating entity,
  ii) a originating entity website domain associated with a website of the originating entity,
  iii) a originating entity address associated with a mailing address of the originating entity,
  iv) a originating entity email address associated with originating entity, or
  v) a combination thereof;
determining, by the at least one processor, a match percentage indicating a percent confidence that the originating entity matches the merchant based at least in part on a comparison of the merchant data with the originating entity data; and
determining, by the at least one processor, that the at least one activity record is associated with the originating entity where the match percentage is greater than a match threshold.

17. The method of clause 11, further comprising identifying, by the at least one processor, the active electronic resource subscription based at least in part on comparing contents of the at least one electronic message with a list of content indicative of known mailing lists to finding a matching known mailing list.

18. The method of clause 17, further comprising identifying, by the at least one activity record, an unsubscribe mechanism associated with the active electronic resource subscription based on an unsubscribe template associated with the matching known mailing list.

19. The method of clause 11, wherein the activity record set comprises a activity list in a credit account associated with the user.

20. A system comprising:
at least one processor in communication with a network, wherein the at least one processor is configured to implement instructions to perform steps to:
receive at least one electronic message from at least one originating device associated with an originating entity;

extract message metadata associated with each electronic message of the at least one electronic message;
determine a active electronic resource subscription associated with the at least one electronic message based on the message metadata of each electronic message;
track at least one user interaction command associated with at least one user interaction with the at least one electronic message;
determine a record similarity value for at least one user activity record in a activity record set based at least in part on a measure of similarity between the originating entity and each activity record of the at least one user activity record;
utilize an engagement model to determine an engagement score indicative of a degree of user engagement with the originating entity based at least in part on the at least one user activity and the at least one user interaction metric;
  wherein the engagement model comprises model parameters trained according to a date associated with the at least one user activity record and the at least one user interaction metric to generate a prediction indicative of the degree of user engagement;
determine an unsubscribe condition based at least in part on the engagement score being below a threshold engagement score; and
automatically generate an unsubscribe command in response to the unsubscribe condition causing the active electronic resource subscription to be cancelled by removing a electronic address associated with a user from the active electronic resource subscription.

While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

The invention claimed is:

1. A method comprising:
receiving, by at least one processor, at least one electronic message from at least one originating device associated with an originating entity;
extracting, by the at least one processor, message metadata associated with each electronic message of the at least one electronic message;
determining, by the at least one processor, an active electronic resource subscription associated with the at least one electronic message based on the message metadata of each electronic message;
tracking, by the at least one processor, at least one user interaction command associated with at least one user interaction with the at least one electronic message;
determining, by the at least one processor, a record similarity value for at least one user activity record in an activity log based at least in part on a measure of similarity between the originating entity and each activity record of the at least one user activity record;
utilizing, by the at least one processor, an engagement model to determine an engagement score indicative of a degree of user engagement with the originating entity based at least in part on the at least one user activity and the at least one user interaction metric;
  wherein the engagement model comprises model parameters trained according to a date associated with the at least one user transaction record and the at least one user interaction metric to generate a prediction indicative of the degree of user engagement;
determining, by the at least one processor, an unsubscribe condition based at least in part on the engagement score being below a threshold engagement score; and
automatically generating, by the at least one processor, an unsubscribe command in response to the unsubscribe condition to cause the user to be unsubscribed from the active electronic resource subscription.

2. The method of claim 1, further comprising matching, by the at least one processor, a merchant identifier of the at least one activity record to an originating entity identifier of the at least one electronic message associated with the originating entity using a template parser to convert the originating entity identifier to a common identifier format associated with the activity record set.

3. The method of claim 1, further comprising utilizing, by the at least one processor, a natural language processing model to extract an originating entity identifier from the at least one electronic message to a common identifier format associated the activity record set; and
  matching, by the at least one processor, a merchant identifier of the at least one activity record to the originating entity identifier.

4. The method of claim 1, wherein the at least one originating device comprises an electronic message list serve provider.

5. The method of claim 1, further comprising utilizing, by the at least one processor, one or more electronic resource subscription recognition models to identify the originating entity, an unsubscribe mechanism and the originating system.

6. The method of claim 1, further comprising:
extracting, by the at least one processor, merchant data from the at least one activity record;
  wherein the merchant data comprises:
    i) a merchant identifier associated with the merchant,
    ii) a merchant website domain associated with a website of the merchant,
    iii) a merchant address associated with a mailing address of the merchant,
    iv) a merchant email address associated with merchant, or
    v) a combination thereof;
extracting, by the at least one processor, originating entity data from the at least one electronic message;
  wherein the originating entity data comprises:
    i) a originating entity identifier associated with the originating entity,
    ii) a originating entity website domain associated with a website of the originating entity,
    iii) a originating entity address associated with a mailing address of the originating entity,
    iv) a originating entity email address associated with originating entity, or
    v) a combination thereof;
determining, by the at least one processor, a match percentage indicating a percent confidence that the originating entity matches the merchant based at least in part on a comparison of the merchant data with the originating entity data; and determining, by the at least one processor, that the at least one activity record is associated with the originating entity where the match percentage is greater than a match threshold.

7. The method of claim 1, further comprising identifying, by the at least one processor, the electronic resource subscription based at least in part on comparing contents of the at least one electronic message with a list of content indicative of known mailing lists to finding a matching known mailing list.

8. The method of claim 7, further comprising identifying, by the at least one activity record, an unsubscribe mechanism associated with the active electronic resource subscription based on an unsubscribe template associated with the matching known mailing list.

9. The method of claim 1, wherein the activity record set comprises an activity list in a credit account associated with the user.

10. The method of claim 1, further comprising:
tracking, by the at least one processor, the at least one user interaction metric using an application extension associated with a software application for interacting with the at least one electronic message; and
wherein the at least one user interaction metric comprises:
   i) a click rate indicative of a number of clicks by the user per electronic message of the at least one electronic message,
   ii) an open duration indicative of an amount of time each electronic message of the at least one electronic message remains open,
   iii) a scroll indicator indicative of an amount of each electronic message of the at least one electronic message that is scrolled through,
   iv) a reply indicator indicating whether each electronic message of the at least one electronic message is replied to, or
   v) a combination thereof.

11. A method comprising:
receiving, by at least one processor, at least one electronic message from at least one originating device associated with an originating entity;
extracting, by the at least one processor, message metadata associated with each electronic message of the at least one electronic message;
determining, by the at least one processor, a active electronic resource subscription associated with the at least one electronic message based on the message metadata of each electronic message;
determining, by the at least one processor, a record similarity value for at least one user activity record in an activity record set based at least in part on a measure of similarity between the originating entity and each activity record of the at least one user activity record;
utilizing, by the at least one processor, an engagement model to determine an engagement score indicative of a degree of user engagement with the originating entity based at least in part on the at least one user activity;
wherein the engagement model comprises model parameters trained according to a date associated with the at least one user activity record to generate a prediction indicative of the degree of user engagement;
determining, by the at least one processor, an unsubscribe condition based at least in part on the engagement score being below a threshold engagement score; and
automatically generating, by the at least one processor, an unsubscribe command in response to the unsubscribe condition causing the active electronic resource subscription to be cancelled by removing a electronic address associated with a user from the active electronic resource subscription.

12. The method of claim 11, further comprising matching, by the at least one processor, a merchant identifier of the at least one activity record to an originating entity identifier of the at least one electronic message associated with the originating entity using a template parser to convert the originating entity identifier to a common identifier format associated with the activity record set.

13. The method of claim 11, further comprising utilizing, by the at least one processor, a natural language processing model to extract an originating entity identifier from the at least one electronic message to a common identifier format associated the activity record set; and
matching, by the at least one processor, a merchant identifier of the at least one activity record to the originating entity identifier.

14. The method of claim 11, wherein the at least one originating device comprises an electronic message list serve provider.

15. The method of claim 11, further comprising utilizing, by the at least one processor, one or more subscription list recognition models to identify the originating entity, an unsubscribe mechanism and the originating system.

16. The method of claim 11, further comprising:
extracting, by the at least one processor, merchant data from the at least one activity record;
   wherein the merchant data comprises:
      i) a merchant identifier associated with the merchant,
      ii) a merchant website domain associated with a website of the merchant,
      iii) a merchant address associated with a mailing address of the merchant,
      iv) a merchant email address associated with merchant, or
      v) a combination thereof;
extracting, by the at least one processor, originating entity data from the at least one electronic message;
   wherein the originating entity data comprises:
      i) a originating entity identifier associated with the originating entity,
      ii) a originating entity website domain associated with a website of the originating entity,
      iii) a originating entity address associated with a mailing address of the originating entity,
      iv) a originating entity email address associated with originating entity, or
      v) a combination thereof;
determining, by the at least one processor, a match percentage indicating a percent confidence that the originating entity matches the merchant based at least in part on a comparison of the merchant data with the originating entity data; and
determining, by the at least one processor, that the at least one activity record is associated with the originating entity where the match percentage is greater than a match threshold.

17. The method of claim 11, further comprising identifying, by the at least one processor, the active electronic resource subscription based at least in part on a subscription identification model to that classifies subscriptions based on contents of the at least one electronic message and trained parameters trained on a list of content indicative of known mailing lists to finding a matching known mailing list.

18. The method of claim 17, further comprising identifying, by the at least one activity record, an unsubscribe mechanism associated with the active electronic resource subscription based on an unsubscribe template associated with the matching known mailing list.

19. The method of claim 11, wherein the activity record set comprises an activity list in a credit account associated with the user.

20. A system comprising:
at least one processor in communication with a network, wherein the at least one processor is configured to implement instructions to perform steps to:
receive at least one electronic message from at least one originating device associated with an originating entity;
extract message metadata associated with each electronic message of the at least one electronic message;
determine an active electronic resource subscription associated with the at least one electronic message based on the message metadata of each electronic message;
track at least one user interaction command associated with at least one user interaction with the at least one electronic message;
determine a record similarity value for at least one user activity record in an activity record set based at least in part on a measure of similarity between the originating entity and each activity record of the at least one user activity record;
utilize an engagement model to determine an engagement score indicative of a degree of user engagement with the originating entity based at least in part on the at least one user activity and the at least one user interaction metric;
wherein the engagement model comprises model parameters trained according to a date associated with the at least one user activity record and the at least one user interaction metric to generate a prediction indicative of the degree of user engagement;
determine an unsubscribe condition based at least in part on the engagement score being below a threshold engagement score; and
automatically generate an unsubscribe command in response to the unsubscribe condition causing the active electronic resource subscription to be cancelled by removing a electronic address associated with a user from the active electronic resource subscription.

* * * * *